June 15, 1954   J. H. BALL   2,680,847
SUNGLASSES
Filed Aug. 25, 1953
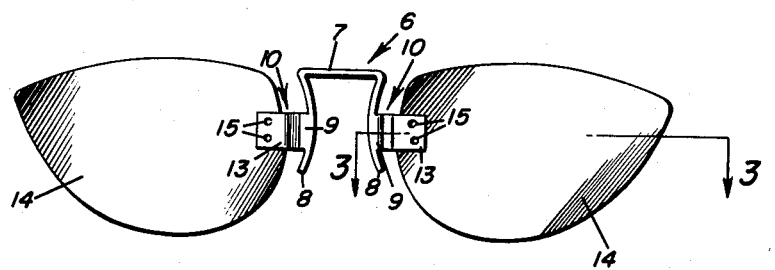
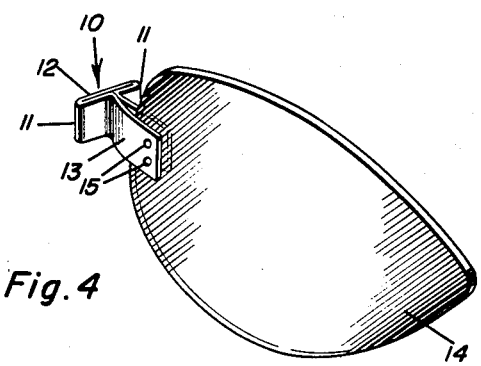
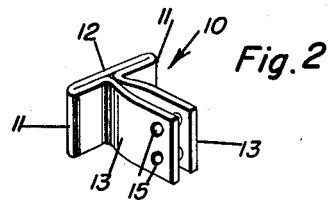
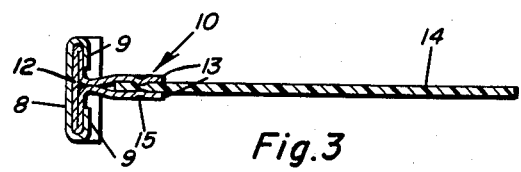
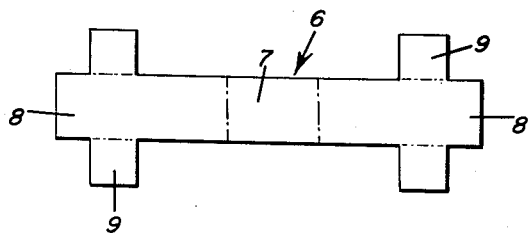
John H. Ball
INVENTOR.

Patented June 15, 1954

2,680,847

UNITED STATES PATENT OFFICE 2,680,847

SUNGLASSES

John H. Ball, Abilene, Tex.

Application August 25, 1953, Serial No. 376,394

3 Claims. (Cl. 2—14)

The present invention relates to new and useful improvements in sun glasses to be used particularly by children as a toy and has for its primary object, in a manner as hereinafter set forth, an article of the character wherein the lenses may be readily removed and replaced as desired.

Another very important object of the invention is to provide a pair of toy sun glasses of the aforementioned character comprising novel means for securing said glasses in position on the nose of the wearer.

Other objects of the invention are to provide a pair of toy sun glasses which will be comparatively simple in construction, strong, durable, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of a pair of sun glasses embodying the present invention;

Figure 2 is a detail view in perspective of one of the lens clips;

Figure 3 is a view in horizontal section, taken substantially on the line 3—3 of Figure 1;

Figure 4 is a perspective view of one of the lenses and its mounting clip; and

Figure 5 is a plan view of the blank from which the resilient nose clamp or spring is formed.

Referring now to the drawing in detail, it will be seen that the embodiment of the invention which has been illustrated comprises a substantially U-shaped nose clamp or spring of suitable resilient metal which is designated generally by reference character 6. The clamp 6 includes a bight portion 7 and a pair of inwardly bowed legs 8. Of course, the legs 8 receive and grip the bridge portion of the nose therebetween. Formed integrally with the longitudinal edges of the legs 8 of the clamp 6 are pairs of outwardly and inwardly turned flanges 9.

The pairs of flanges 9 are for the purpose of removably mounting on the legs 8 of the nose clamp 6 a pair of resilient clips 10. As best seen in Figure 2 of the drawing, the clips 10 are also formed from a single length of suitable metal which is folded transversely on itself at longitudinally spaced points, as at 11, in a manner to define a T-head 12. The clips 10 further include opposed, resilient jaws 13 for the reception of lenses 14 therebetween.

The lenses 14 are of any suitable transparent plastic and may be of any desired shape. The inner marginal portions of the lenses 14 are secured between the jaws 13 of the clips 10. Toward this end, the clip jaws 13 are provided with pressed detents or lugs 15 for ensuring a firm grip on the lenses.

It is thought that the manner in which the article is used will be apparent from a consideration of the foregoing. Briefly, with the plastic lenses 14 in position, the clamp 6 is mounted on the bridge portion of the nose in a manner to support said lenses before the eyes of the wearer. When it is desired to remove and replace the lenses this may be expeditiously accomplished by simply slipping the clips 10 out from under the retaining flanges 9. Also, the lenses 14 may be removed from the clips 10 when desired.

It is believed that the many advantages of a pair of sun glasses constructed in accordance with the present invention will be readily understood and although a preferred embodiment of the article is as illustrated and described, it is to be understood that changes in the details of construction may be resorted to which will fall within the scope of the invention as claimed.

What is claimed is:

1. A pair of sun glasses comprising a substantially U-shaped resilient nose clamp, pairs of opposed, outwardly and inwardly turned resilient flanges integral with the longitudinal edges of the legs of said nose clamp, substantially T-shaped clips having their head portions engaged beneath the pairs of flanges for removably mounting said clips on the clamp, and plastic lenses mounted on said clips.

2. A pair of sun glasses comprising a substantially U-shaped resilient nose clamp, pairs of opposed, outwardly and inwardly turned resilient flanges integral with the longitudinal edges of the legs of said nose clamp, substantially T-shaped clips having their head portions engaged beneath the pairs of flanges for removably mounting said clips on the clamp, and plastic lenses mounted on said clips, said clips including pairs of opposed, resilient jaws projecting from said head portions and adapted to receive the lenses therebetween, said jaws including detents for anchoring the lenses therebetween.

3. A pair of sun glasses of the character described comprising a substantially U-shaped resilient nose clamp, said nose clamp including a single length of flat metal bent to provide a bight portion and leg portions, pairs of outwardly and inwardly turned resilient flanges integral with the longitudinal edges of said leg portions, substantially T-shaped clips having their head portions engaged beneath the pairs of flanges for removably mounting said clips on the clamp, each of said clips being formed from a single length of flat metal bent transversely on itself at longitudinally spaced points and terminating in substantially right angularly projecting end portions defining opposed resilient jaws, and plastic lenses mounted between the pairs of jaws.

References Cited in the file of this patent

UNITED STATES PATENTS

| Number | Name | Date |
|---|---|---|
| 789,461 | Smith | May 9, 1905 |
| 863,343 | Antholine | Aug. 13, 1907 |

FOREIGN PATENTS

| Number | Country | Date |
|---|---|---|
| 242,000 | Germany | Dec. 20, 1911 |
| 203,479 | Great Britain | Sept. 13, 1923 |